US009268668B1

(12) United States Patent
Lachwani et al.

(10) Patent No.: US 9,268,668 B1
(45) Date of Patent: Feb. 23, 2016

(54) SYSTEM FOR TESTING MARKUP LANGUAGE APPLICATIONS

(71) Applicant: GOOGLE INC., Mountain View, CA (US)

(72) Inventors: Manish Lachwani, Sunnyvale, CA (US); Jay Srinivasan, San Francisco, CA (US); Pratyus Patnaik, San Francisco, CA (US)

(73) Assignee: Google Inc., Mountain View, CA (US)

( * ) Notice: Subject to any disclaimer, the term of this patent is extended or adjusted under 35 U.S.C. 154(b) by 106 days.

(21) Appl. No.: 13/721,632

(22) Filed: Dec. 20, 2012

(51) Int. Cl.
G06F 9/44 (2006.01)
G06F 11/36 (2006.01)
G06F 9/455 (2006.01)
G06F 9/45 (2006.01)

(52) U.S. Cl.
CPC .............. *G06F 11/3664* (2013.01); *G06F 8/51* (2013.01); *G06F 9/455* (2013.01)

(58) Field of Classification Search
CPC ..... G06F 8/51; G06F 9/45529; G06F 11/004; G06F 11/3409; G06F 11/3664
USPC .................................................. 717/114, 138
See application file for complete search history.

(56) References Cited

U.S. PATENT DOCUMENTS

| | | | |
|---|---|---|---|
| 4,953,084 A | 8/1990 | Meloy et al. | |
| 6,078,743 A * | 6/2000 | Apte et al. | 717/100 |
| 6,131,188 A | 10/2000 | Goebel | |
| 6,145,122 A * | 11/2000 | Miller et al. | 717/129 |
| 6,151,701 A | 11/2000 | Humphreys et al. | |
| 6,353,923 B1 * | 3/2002 | Bogle et al. | 717/128 |
| 6,598,221 B1 | 7/2003 | Pegatoquet et al. | |
| 6,829,733 B2 | 12/2004 | Richardson et al. | |
| 7,051,238 B2 | 5/2006 | Gardner et al. | |
| 7,127,641 B1 * | 10/2006 | Anderson | 714/38.1 |
| 7,370,315 B1 * | 5/2008 | Lovell et al. | 717/100 |
| 7,418,697 B2 | 8/2008 | Gryko et al. | |
| 7,805,707 B2 | 9/2010 | Pouliot | |
| 7,870,540 B2 | 1/2011 | Zare et al. | |
| 7,991,747 B1 | 8/2011 | Upadhyay et al. | |
| 8,370,810 B2 | 2/2013 | Oda | |
| 8,479,166 B2 | 7/2013 | Nir-Buchbinder et al. | |
| 8,504,987 B2 * | 8/2013 | Li et al. | 717/115 |
| 8,671,080 B1 | 3/2014 | Upadhyay et al. | |
| 2002/0010710 A1 | 1/2002 | Binnig | |

(Continued)

OTHER PUBLICATIONS

Pyzocha, "Non Final Office Action dated May 13, 2014", U.S. Appl. No. 13/655,667, The United States Patent and Trademark Office, May 13, 2014.

(Continued)

*Primary Examiner* — Ryan Coyer
(74) *Attorney, Agent, or Firm* — McDonnell Boehnen Hulbert & Berghoff LLP

(57) ABSTRACT

A system is described for remotely testing markup language and script language based applications executing on a computing device. A development device such as a desktop computer executes one or more development tool modules. A communication module and an unpack module are deployed to a computing device which executes the application under test. These modules serve to connect the development tool module executing on the development device to an embedded test tool executing on the computing device. Using this connection, the development tool module is able to interactively test and interact with the application executing on the computing device.

28 Claims, 10 Drawing Sheets

(56) References Cited

U.S. PATENT DOCUMENTS

| | | | |
|---|---|---|---|
| 2002/0040470 | A1 | 4/2002 | Guthrie et al. |
| 2002/0166081 | A1 | 11/2002 | Richardson et al. |
| 2003/0221184 | A1 | 11/2003 | Gunjal et al. |
| 2004/0194072 | A1* | 9/2004 | Venter ............................ 717/140 |
| 2005/0273776 | A1 | 12/2005 | Guilford |
| 2005/0278707 | A1 | 12/2005 | Guilford |
| 2006/0059253 | A1 | 3/2006 | Goodman et al. |
| 2006/0242709 | A1 | 10/2006 | Seinfeld et al. |
| 2007/0288644 | A1* | 12/2007 | Rojas et al. ................... 709/230 |
| 2008/0005044 | A1* | 1/2008 | Benya et al. ................... 705/412 |
| 2008/0104575 | A1* | 5/2008 | Fan et al. ....................... 717/124 |
| 2008/0201453 | A1* | 8/2008 | Assenmacher ................. 709/219 |
| 2008/0307328 | A1* | 12/2008 | Hatcher et al. ................. 715/760 |
| 2009/0150420 | A1 | 6/2009 | Towner |
| 2009/0260022 | A1* | 10/2009 | Louch et al. ................... 719/328 |
| 2010/0257539 | A1* | 10/2010 | Narayanan et al. ............ 719/311 |
| 2011/0047597 | A1 | 2/2011 | Mahaffey et al. |
| 2011/0289483 | A1 | 11/2011 | Williams et al. |
| 2012/0260344 | A1* | 10/2012 | Maor et al. ....................... 726/25 |
| 2012/0291011 | A1* | 11/2012 | Quine ............................ 717/115 |
| 2013/0060890 | A1 | 3/2013 | Lee et al. |
| 2013/0152047 | A1 | 6/2013 | Moorthi et al. |
| 2013/0185798 | A1 | 7/2013 | Saunders et al. |
| 2013/0227521 | A1* | 8/2013 | Bourd et al. ................... 717/110 |
| 2013/0227636 | A1 | 8/2013 | Bettini et al. |
| 2013/0276061 | A1 | 10/2013 | Chebiyyam et al. |
| 2013/0282892 | A1 | 10/2013 | Levi et al. |
| 2014/0020096 | A1 | 1/2014 | Khan et al. |
| 2014/0082729 | A1 | 3/2014 | Shim et al. |

OTHER PUBLICATIONS

"debugserver", [online] [retrieved on Apr. 22, 2014] Retrieved from the Internet: <http://iphonedevwiki.net/index.php/Debugserver>.

Chowdhury, "Non Final Office Action dated Feb. 13, 2014", U.S. Appl. No. 13/631,919, The United States Patent and Trademark Office, Feb. 13, 2014.

LLDB.LLVM.org, "The LLDB Debugger", [online] [retrieved Apr. 22, 2014] Retrieved from the Internet: <http://lldb.llvm.org/>.

Charles Lu, "Debug Java applications remotely with Eclipse", developerWorks, IBM, Dec. 9, 2008, [online] [retrieved on Apr. 2, 2014] Retrieved from the Internet: <http://www.ibm.com/developerworks/librarytos-eclipse-javadebug/index.html>.

Javin Paul, "How to setup Java remote debugging in Eclipse", Javarevisited-Blog about Java programming language, FIX Protocol, Tibco Rendezvous and related Java technology stack, Feb. 25, 2011, [online] [retrieved Apr. 22, 2014] Retrieved from the Internet: <http://javarevisited.blogspot.com/2011/02/how-to-setup-remote-debugging-in.html>.

Bakos, et al., "Lightweight Error Correction Coding for System-Level Interconnects", IEEE Transactions on Computers, vol. 56, No. 3, Mar. 2007, pp. 1-16 [online], [retrieved on Jul. 2, 2014]. Retrieved from the Internet <URL:http://kona.ee.pitt.edu/steve/Recent%20Publications/TC_2007_TC-0414-1105-1.pdf>.

Chowdhury, "Notice of Allowance dated Jul. 2, 2014", U.S. Appl. No. 13/631,919, The United States Patent and Trademark Office, Jul. 2, 2014.

Dearle, "Software Deployment, Past, Present and Future", IEEE 2007, pp. 1-16 [online], [retrieved on Jul. 2, 2014]. Retrieved from the Internet <URL:http://www.cs.tufts.edu/comp/250SA/papers/dearle2007.pdf>.

Guglielmo, et al., "Model-Driven Design and Validation of Embedded Software", 2011 ACM, pp. 98-104 [online], [retrieved on Jul. 2, 2014]. Retrieved from the Internet <URL:http://dbonline.igroupnet.com/ACM.TOOLS/Rawdata/Acm1106/fulltext/1990000/1982616/p98-guglielmo.pdf>.

Rueher, et al., "Capturing Software Processes Through the Generated Objects", 1988, pp. 148-152 [online], [retrieved on Jul. 2, 2014]. Retrieved from the Internet <URL:http://delivery.acm.org/10.1145/80000/75138/p148-rueher.pdf>.

Pyzocha, "Non Final Office Action dated Sep. 9, 2014", U.S. Appl. No. 13/655,667, The United States Patent and Trademark Office, Sep. 9, 2014.

Seo, et al., "Analysis on maliciousness for mobile applications", 2012 Sixth International Conference on Innovative Mobile and Internet Services in Ubiquitous Computing, IEEE, 2012, pp. 126-129.

* cited by examiner

SYSTEM FOR TESTING MARKUP LANGUAGE APPLICATIONS

BACKGROUND

With the growing popularity of computing devices, there is an increasing demand for applications, or apps, to run on such devices. These devices may include smartphones, tablet computers, televisions, set-top boxes, in-vehicle computer systems, home entertainment systems, and so forth. To satisfy this demand, programmers are constantly building, testing, and maintaining applications. Testing of these applications is useful for quality assurance to find and correct errors.

Figure 1:
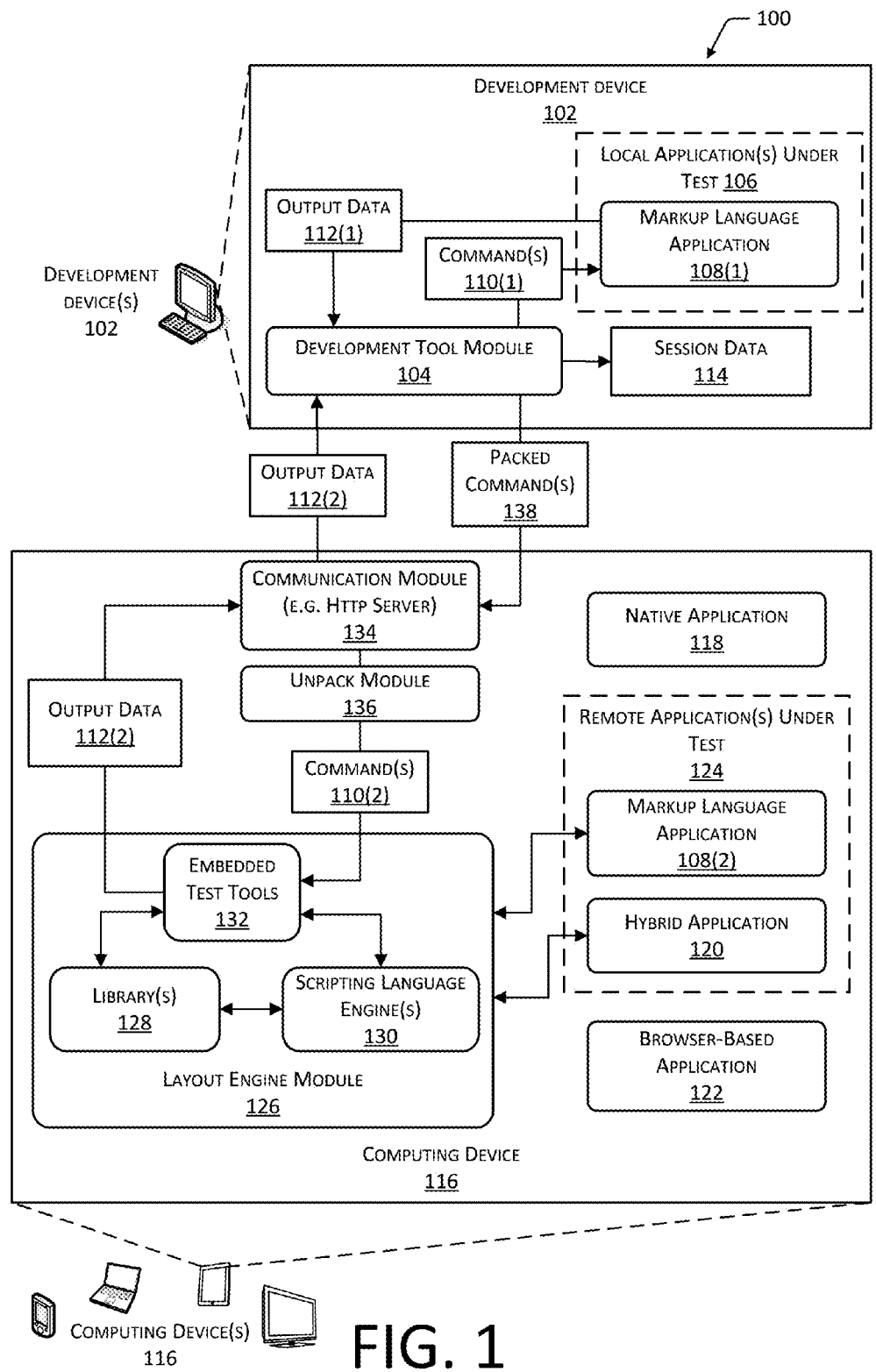
FIG. 1 depicts an environment having a development device for testing markup language applications executing on a remote computing device.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Overview

A wide variety of applications or apps are developed for execution on computing devices including smartphones, tablet computers, televisions, set-top boxes, in-vehicle computer systems, home entertainment systems, and so forth.

There is an increasing demand for software developers to build applications, or apps, to run on such devices. Software developers build, test, and maintain applications using a variety of development tools. Testing provides many benefits including finding and correcting errors, improving performance, and so forth. Testing may include observing processor usage, observing memory allocation, programmatic debugging, determining usability, validating functionality, and so forth.

Different types of applications may be available for use on the computing devices. These include native applications, markup language applications, hybrid applications, and browser-based applications. Native applications are those which are written and compiled for execution on the particular device. For example, native applications may be written in a programming language such as C++ or Objective C and compiled into native code such as a binary executable for use on the device. Markup language applications include one or more instructions in a markup language which may be rendered by a layout engine and one or more instructions in a scripting language which may be interpreted by a scripting language engine during execution. For example, a hypertext markup language ("HTML") version 5 (or greater) markup language application may include HTML, cascading style sheets ("CSS"), and JavaScript. In some implementations the markup language application may have multiple instances of the UIWebView class references. Hybrid applications include native code and markup language application portions. Browser-based applications are processed within a web browser application and are limited in execution. The browser-based applications may have only a single UIWebView instance.

Markup language applications confer several advantages including, in particular, ease of deployment across different devices with no adjustment or minimal adjustment. For example, a markup language application for a smartphone from one manufacturer may also be executed on an in-vehicle system. In comparison, a native application may need to be re-coded, recompiled, and so forth to operate on different platforms. The platforms may be distinguished by different processors, operating systems, or combinations thereof.

Traditional testing systems have lacked the ability to provide development tools for testing for markup language applications executing on computing devices. Software developers have had to rely on cumbersome methods for testing, including insertion of debug code, use of simulators, and so forth. The insertion of debug code, such as found in a software development kit ("SDK"), or manual breakpoints requires ongoing editing and adjustment of the code, and may result in incorrect or missed information. Likewise, the simulators lack the full fidelity provided by execution on the actual computing device.

This disclosure describes embodiments of systems and methods for testing markup language applications using an actual computing device. A development device such as a desktop computer may execute one or more development tools such as debuggers, memory debuggers, and so forth. These development tools may be used to test markup language applications which are either local to the development device or which are remote, such as those executing on the computing device. In one implementation the development tools may include the Safari® Inspector as developed by Apple Corp. of Cupertino, Calif.

The computing device includes a communication module and an unpack module. These modules are configured to allow communication between the development tools of the development device and embedded test tools which are present on the computing device. These embedded test tools may be incorporated into other modules, such as a layout engine module. In one implementation the layout engine module may comprise WebKit® as promulgated by Apple Corp. and others through an open source development model.

In one implementation, the communication module may comprise a lightweight hypertext transport protocol ("HTTP") server which receives commands from the development tool of the development device. These commands are passed to the unpack module which unpacks the commands from their transport packets and provides unpacked command data to the layout engine module for processing. Output from the embedded test tool may then be provided to the communication module for transfer to the development tool module of the development device.

By using the communication module and unpack module, the development tool module is able to access and test applications which use markup language on the actual client device. Because additional debugging code is not required, and the actual computing device is used, the results of the test are of high fidelity to actual operations of the application as experienced by an end-user.

The communication module and unpack modules may be readily adapted for use on different computing device platforms while providing functionality to the development tool of the development device. As a result, the same development tool may be used to test the markup language applications across several different platforms. This may expedite the development process by allowing the software developer to use a familiar tool across many platforms. By eliminating the need for insertion of debugging code and the associated effort involved, overall productivity and effectiveness of the software development effort is improved. Finally, the use of the actual computing device during testing provides the highest fidelity testing available which is representative of the end-user experience, which may improve quality of the application as released to the end user.

Illustrated Environment

FIG. 1 depicts an environment 100 for testing markup language applications executing on a remote or external computing device. A development device 102 is depicted. The development device 102 is configured to execute at least in part one or more development tool modules 104. The development tool module 104 provides applications for testing, debugging, runtime editing of the application being tested, and so forth. In one implementation the development tool module 104 may include the Safari® Inspector as developed by Apple Corp, the GNU debugger ("gdb") as maintained by the GDB Steering Committee, and so forth.

The development device 102 may be used to test one or more local applications under test 106. This local application under test 106 includes a markup language application 108. The development tool module 104 may be configured to provide testing of the local application under test 106. This testing may include the development tool module 104 providing one or more commands 110 to a local layout engine module (not depicted here). The local layout engine module is configured to execute or interpret the markup language application 108, and return output data 112. The output data 112 may include crash dumps, register values, memory information, timing data, hardware resource usage data, and so forth.

In one implementation the layout engine module may comprise WebKit® as promulgated by Apple Corp. and others. In this implementation, the commands 110 may be debugging commands compatible with the WebKit® layout engine and internal components such as the WebCore, JSCore, and so forth.

In this illustration, the development tool module 104 is providing commands 110(1) to the markup language application 108(1) which is local to the development device 102. The development tool module 104 may receive the output data 112(1) resulting from the execution of the markup language application 108 by the local layout engine module.

The development tool module 104 may provide session data 114. The session data 114 may include data based at least in part on the commands 110, the output data 112, and so forth. This session data 114 may be saved for later analysis, sent to another device, and so forth. In some implementations, the development tool module 104 may be configured to replay previously stored session data 114. The development device 102 is described in more detail below with regard to FIG. 3.

As described above, testing using a particular computing device platform provides valuable information which is useful to the software developer and others. One or more computing devices 116 may be coupled to the development device 102. This coupling enables the development tool module 104 of the development device 102 to test a markup language application 108(2) on the computing device 116. Because of the coupling and testing facilities made available through the development tool module 104, debug code or other testing instructions may be omitted from a remote application under test 124.

The computing device 116 may include a native application 118, the markup language application 108, a hybrid application 120, a browser-based application 122, or a combination thereof.

The native application 118 is written and compiled for execution on the particular computing device 116 platform. For example, native applications may be written in a programming language such as C++ or Objective C and compiled into native code such as a binary executable for use on the device having a particular processor and operating system.

In comparison, markup language applications 108 include one or more instructions in a markup language which is rendered and a scripting language which is interpreted by a scripting language engine during execution. For example, a hypertext markup language ("HTML") version 5 (or greater) markup language application may include HTML and cascading style sheets ("CSS") as the markup language and JavaScript as the scripting language. In some implementations the markup language application 108 may have multiple instances of the UIWebView class references.

The hybrid applications 120 include native code as well as markup language application portions. For example, portions of native code may be used to interact with platform-specific hardware such as a graphics processing unit while portions of markup language provide business logic and user interface elements.

The browser-based applications 122 are processed within a web browser application and are limited in their execution by the constraints of the web browser. The browser-based application 122 is executed within a particular sandbox and executes within the web browser. The browser-based applications may have only a single UIWebView instance. Browser-based applications 122 are further constrained in that they may share caches and other resources with the web browser and also occupy the same sandbox as the web browser. Sandboxing and distinctions between the different applications are discussed below with regard to FIG. 2.

The computing device 116 may include one or more of the remote applications under test 124. These applications are "remote" in that they are executing on a different device from the development device 102 and the development tool module 104. The remote applications under test 124 may include the markup language application 108(2), the hybrid application 120, or both.

The remote applications under test 124 may use a layout engine module 126 during execution. In one implementation the layout engine module 126 may comprise WebKit® as promulgated by Apple Corp. and others. In this implementation, the commands 110 may comprise WebKit® commands.

The layout engine module 126 may include one or more libraries 128, scripting language engines 130, embedded test tools 132, and so forth. The libraries 128 may comprise previously stored program instructions which may be called by applications during execution. These libraries 128 may include those involved in layout, rendering, document object model ("DOM") creation, graphics libraries, and so forth. In one implementation the graphics libraries may include WebGL as promulgated by the Khronos Group of Beaverton, Oreg.

The scripting language engines 130 are configured to interpret and execute the scripting language portion of the markup language application 108 or the hybrid application 120. In the WebKit® implementation the scripting language engine 130 may comprise the JavaScript Core. Other scripting language engines 130 may also be present. For example, the Nitro JS engine provided by Apple Corp., the Carakan JavaScript engine provided by Opera Software of Oslo, Norway, and so forth may be available on the computing device 116 for use. These may be regularly available on the computing device 116, or may be specifically loaded onto the computing device 116 for testing purposes.

The layout engine module 126 includes one or more of the embedded test tools 132. The embedded test tools 132 are functionalities in the layout engine module 126 which may be used for testing. The embedded test tools 132 may include facilities for runtime editing, providing memory allocation information, platform resource usage information, and so forth. The embedded test tools 132 are configured to interact with the scripting language engine 130 or other portions of the layout engine module 126. The embedded test tools 132 may generate the output data 112. The embedded test tools 132 may be used in conjunction with the development tool module 104 executing on the development device 102 to provide various testing capabilities to the software developer.

Communication between the development tool module 104 on the development device 102 and the layout engine module 126 is provided by a communication module 134 and an unpack module 136. The communication module 134 is configured to send and receive information to a device external to the computing device 116, such as the development device 102. The communication module 134 may use various physical transports to exchange information includeing universal serial bus ("USB"), Institute of Electrical and Electronics Engineers ("IEEE") 1394 "Firewire", wired Ethernet, wireless such as Wi-Fi or Bluetooth, and so forth. Transmission control protocol ("TCP"), user datagram protocol ("UDP") or other transport layer protocols may be used in conjunction with the physical transports to exchange information between the development device 102 and the computing device 116. In one implementation the physical transport may comprise USB and data may be sent using hypertext transport protocol ("HTTP") over TCP ("HTTP/TCP").

In one implementation, the communication module 134 may comprise a lightweight HTTP server. This server is configured to send and receive data, and is considered lightweight in that it executes with relatively small resource overhead and has a more limited feature set than that provided by a typical web server application, such as Apache HTTP server. For example, the communication module 134 may omit functions such as support for HTTP Secure ("HTTPS").

The communication module 134 receives packed commands 138 from the development tool 104 of the development device 102. The commands 110 may be packetized or otherwise manipulated for transport between the development tool module 104 on the development device 102 and the computing device 116, forming the packed commands 138. The communication module 134 passes the received packed commands 138 to the unpack module 136.

The unpack module 136 is configured to process the packed commands 138 and provide unpacked commands 110(2) to the layout engine module 126. The processing may include removing transport-associated information such as headers, routing information, and so forth. For example, the unpack module 136 may remove TCP headers and reassemble payloads across multiple packets to form the commands 110(2). In some implementations the unpacked commands 110(2) may be in extensible markup language procedure call ("XPC") format.

The unpack module 136 provides the unpacked commands 110(2) to the layout engine module 126 for processing. The unpacked commands 110(2) are compatible with the embedded test tools 132 and other aspects of the layout engine module 126 and an associated framework. Just as the development tool module 104 may send commands 110(1) associated with the local application under test 106, the development tool module may send commands 110(2) associated with the remote application under test 124. The layout engine module 126 may be configured to operate such that commands 110 are provided and responses such as the output data 112 are generated.

The communication module 134 and the unpack module 136 are described in this disclosure as separate modules. In some implementations at least a portion of the functionality of these modules may be combined into a single module, or incorporated into another module. The computing device 116 is described in more detail below with regard to FIG. 4.

Figure 2:
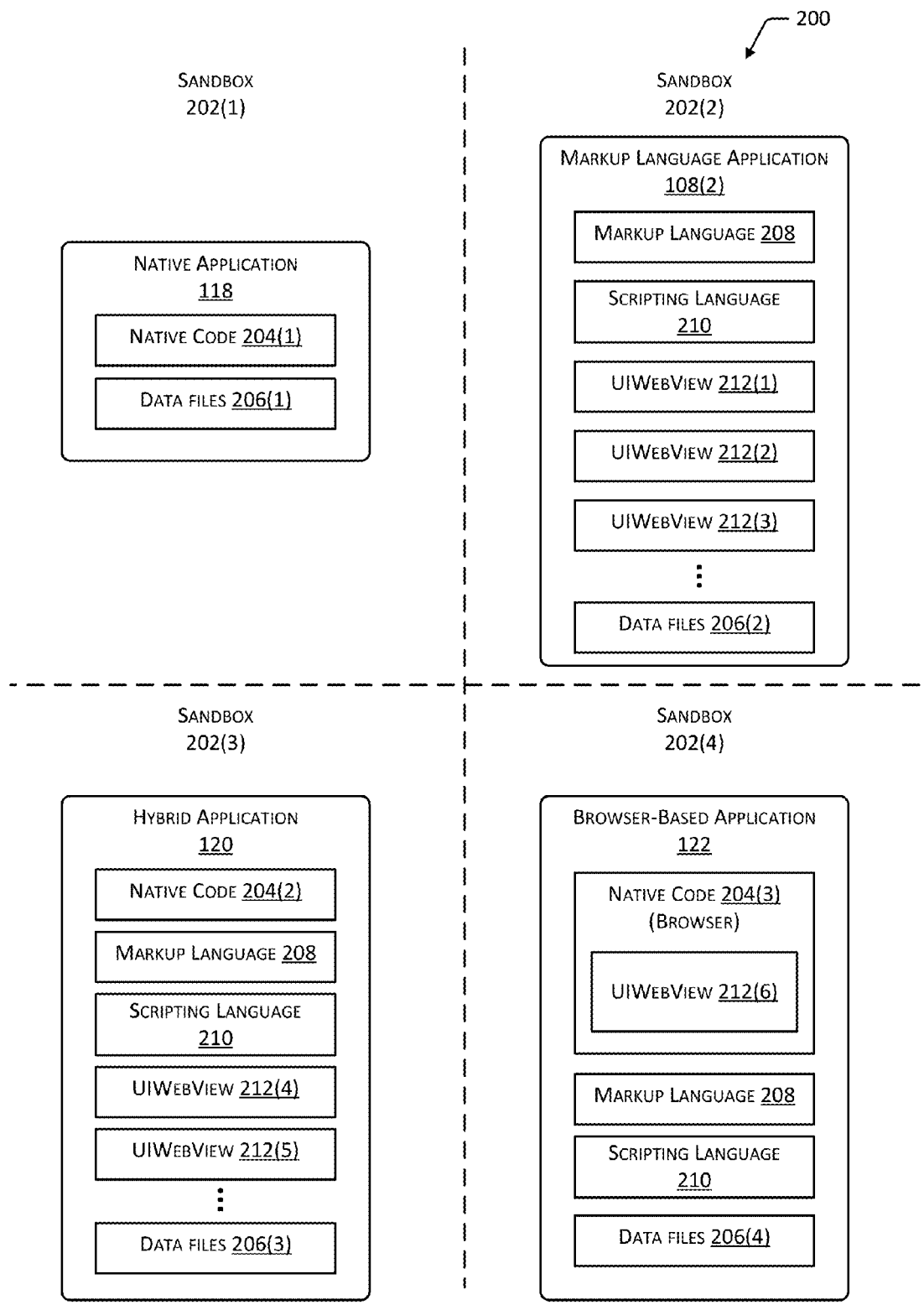
FIG. 2 illustrates different types of applications available for execution on the computing device, including those which use markup language.

FIG. 2 illustrates different types 200 of applications available for execution on the computing device 116. As described above, these types include the native application 118, the markup language application 108, the hybrid application 120, and the browser-based application 122.

Some operating systems executing on the computing devices 116 may provide for sandboxes 202 or sandboxing. The sandbox 202 comprises an environment with access controls applied to executing processes. These access controls may be provided to limit or control interactions between the executing applications and with other devices or applications. Sandboxing may be used to mitigate the effects of malicious or improperly-coded applications. In some implementations the sandboxes 202 may be implemented as separate virtual machines within which the application may execute. Some operating systems, such as the iOS® operating system by Apple Corp. provide for sandboxing applications.

In this illustration four sandboxes 202(1)-(4) are depicted, with a different application in each. However, it is understood that in some implementations, sandboxing may be omitted and the various applications may execute in a common environment.

The sandbox 202(1) contains the native application 118. As described above, the native application 118 is written and compiled for execution on the particular computing device 116 platform. The native application 118 comprises native code 204 and may also include one or more data files 206. The native code 204 comprises a binary executable for use on a particular platform. For example, the native application 118 may be written in a programming language such as Objective C and compiled into native code 204(1). The data files 206(1) may include application cache, user preferences, user data, and so forth.

The sandbox 202(2) contains the markup language application 108(2). The markup language application 108(2) includes one or more instructions expressed in a markup language 208. The markup language 208 may use one or more tags to specify particular rendering of content. For example, the markup language may comprise instructions compliant with hypertext markup language ("HTML") version 5. The markup language 208 may also include cascading style sheets ("CSS"). While the examples in this disclosure use HTML5 or later, the systems and methods described may also be applied to other markup languages.

The markup language application 108(2) may also include instructions expressed in a scripting language 210. The scripting language 210 is configured for processing by an interpreter during execution. For example, the scripting language 210 may comprise JavaScript and the interpreter may comprise the JavaScript Core in WebKit®. While the examples in this disclosure use JavaScript, the systems and methods described may also be applied to other scripting languages.

In some implementations the markup language application 108 may have multiple instances of the UlWebView 212 class references. These UlWebView 212 instances enable presentation of content expressed using a markup language 208 such as HTML5 with CSS and a scripting language 210 such as JavaScript. For example, as depicted here, the markup language application 108(2) may have UlWebView instances 212(1)-(3).

The markup language application 108 may also have one or more data files 206. As described above, the data files 206(2) may include property list ("PLIST") files, caches, user preferences, user data, icons, cookies, databases, temporary files, temporary directories, and so forth. In some implementations a portion or all of the data files 206 may be stored on a remote device, such as a backend server accessible via the Internet. Software developers may thus minimize or eliminate the data which is stored locally on the computing device 116. This may be done to reduce local storage requirements, improve security of the data, and so forth. For example, upon loss or compromise of the computing device 116, the backend server may terminate access, safeguarding the data. Use of the backend server may also minimize or eliminate the complexity associated with encrypting contents in the data files 206 to further safeguard data. The implementation of the markup language application 108 as a front end and the use of the backend server allows for easier purging of data associated with the application when the application is exited or terminated.

The development tool module 104 may be configured to access information about the data files 206 and present that information to the developer for testing, debugging, inspection, and so forth of the local store associated with the remote application under test 124.

For example, consider an example markup language application 108(2) executing in the sandbox 202(2) of the computing device 116 which is executing the iOS® operating system. In this example, the data files 206, such as 206(2), which are associated with remote applications under test 124 may be stored on the computing device 116 at a directory location /var/mobile/Applications/[device specific] where [device specific] indicates a value which may vary from one computing device 116 to another. A command to elicit a listing of the contents in the directory and the corresponding results may be as follows:

```
# /var/mobile/Applications/ [device specific] root# ls
Documents/ Example.app/ Library/ iTunesArtwork iTunesMetadata.plist
    tmp/
/var/mobile/Applications/ [device specific] root# ls Library/
Caches/ Cookies/ Preferences/
/var/mobile/Applications/ [device specific] root# ls tmp/
com.Example.trash/
/var/mobile/Applications/ [device specific] /Library root# ls Caches/
EAStore/ ImageCache/ Snapshots/ analytics/ com.Example.Example/
    EAsyncstore.db orca2.db
```

The files may be analyzed, debugged, or tested, using various tools of the development tool module 104 as appropriate to the file types. For example, where the *.db files indicated above such as EAsyncstore.db use SQLite as developed by D. Richard Hipp and others, the sqlite3 utility be used to execute commands against the database.

As described above, the data files 206 may also include session cookies. For example a command may be used to retrieve these session cookies:

/var/mobile/Applications/[device specific]/Library root# ls Cookies/Cookies.binarycookies The development tool module 104 may also include the plutil to interact with session PLIST files, user data PLIST files, and so forth. For example, the following commands may be used against the data files 206 to elicit information:

```
/var/mobile/Applications/ [device specific] root# plutil
Library/Preferences/100002412262591.session.plist
{
    EAContactImporterServiceLastFetch = 33028.64688166667;
    EAGatekeeperCache =   {
    "iphone_beta_build" = 0;
    "marauder_client_sample_rate" = 0;
    "messenger_wilde_interstitial_promotion" = 0;
    "mobile_ios_four_step_photo_permission" = 0;
    "mobile_ios_two_title_photo_permission" = 1;
    vault = 1;
};
EANewUserExperienceFlowEventTag = 0;
kEABookmarkHasFullSync = 1;
}
/var/mobile/Applications/ [device specific] root# plutil
Library/Preferences/com.Example.Example.plist
{
  DeviceInsightsAttributionExpiryKey = 2012-11-01 07:45:49 +0000;
  DeviceInsightsAttributionIDKey = "100002412262591_AFD9E89D-6035-44DC-985F-FD46728F0B9D";
  EALastLoginEmail = "testuser@example.com";
  EALoginUUID = "CD508416-D87E-411B-BA35-2CFCB618F3AC";
  "EAURLHandlerObserverStatus_EA-messenger://threads/" = 0;
  EAUserAgentSystemUserAgent = "Mozilla/5.0 (iPhone; CPU iPhone OS 6_0_1 like Mac OS X) AppleWebKit/536.26 (KHTML, like Gecko) Mobile/10A523";
  EAUserAgentSystemVersion = 10A523;
  LastPushNotificationsPermissionsPromptDate = 2012-11-01 06:45:50 +0000;
  MgttClientID = "2zrQsDu/RNiszB5GAr6ntQ=";
  OrcaUserProfileVersion = 1;
  "ProjectGating_100002412262591" =    {
    Cache =      {
      "messenger_auth_expire_session_ios" = 1;
      "messenger_divebar_mobile_section" = 0;
      "messenger_divebar_top_m_only" = 0;
      "messenger_divebar_top_short" = 0;
      "messenger_emoji_composer_ios" = 1;
      "messenger_fof_ios" = 1;
      "messenger_inapp_notify_ios" = 1;
      "messenger_last_active_2_ios" = 1;
      "messenger_mgtt_ios" = 1;
      "messenger_new_features" = 0;
      "messenger_nux_ios" = 1;
      "messenger_phone_verification_ios" = 0;
      "messenger_read_receipts_ios" = 1;
      "messenger_video_attachments_ios" = 0;
```

```
    "messenger_voip_ios" = 0;
  };
  LastCheckDate = 2012-11-01 23:45:51 +0000;
};
WebDatabaseDirectory = "/var/mobile/Applications/ [device
specific]/Library/Caches";
WebKitDiskImageCacheSavedCacheDirectory = " ";
WebKitLocalStorageDatabasePathPreferenceKey =
"/var/mobile/Applications/ [device specific] /Library/Caches";
WebKitOfflineWebApplicationCacheEnabled = 1;
WebKitShrinksStandaloneImagesToFit = 1;
appFirstLaunchedWithExistingAccessToken = 0;
"com.Example.analytics.deviceInfoExpireDate" = 2012-11-01 23:55:59
+0000;
kAppiraterCurrentVersion = 82131;
kAppiraterFirstUseDate = 1354772114.876542;
kAppiraterUseCount = 5;
kEAExceptionUserIsEmployee = 0;
kUserGlobalSettings =   {
   100002412262591 =      {
     "should_register_for_push" = 1;
     "show_available_to_chat" = 1;
   };
};
kUserThreadSettings =   {
};
"report_ percentage" = 100;
}
```

By using the development tool module 104, the developer may assess the data files 206 which are locally stored on the computing device 116 by the remote application under test 124. For example, the above information about the data files 206 may be presented within the Safari® Inspector.

The sandbox 202(3) depicts the hybrid application 120. As described above, the hybrid application 120 includes native code 204 as well as markup language 208, scripting language 210, or both. For example, portions of native code 204 may be used to interact with platform-specific hardware such as a graphics processing unit or global positioning system ("GPS") receiver, while portions of markup language provide business logic and user interface elements such as controlling display of mapping information. Similar to the markup language application 108, multiple instances of the UIWebView 212(4) and 212(5) class references may be present. The hybrid application 120 may also have one or more associated data files 206(3).

The sandbox 202(4) depicts the browser-based applications 122. Browser-based applications are processed within a web browser application and are limited in their execution by this constraint. In one implementation the web browser application may be the Safari® browser by Apple Corp. and executing in the iOS operating system. The web browser application may access one or more of the markup language 208 or scripting language 210 for rendering and execution. The browser-based application 122 may have only a single UIWebView 212 instance.

The web browser application's native code 204(3), the rendered markup language 208, the executed scripting language 208, the corresponding single UIWebView 212(6) instance, and the data files 206(4) share the same sandbox 202(4). As a result, there is a potential for unwanted or undesired interactions. For example, the scripting language 210 may improperly invoke a function in the native code 204(3) and generate an error or malicious condition.

Among the types of applications, the markup language application 108 provides a useful blend of benefits. Cross-platform development and maintenance is less than that of native applications 118. Hybrid applications 120 leverage platform-specific native code 204 with the cross-platform capabilities of the markup language 208 and the scripting language 208. The markup language application 108 readily supports multiple UIWebView instances 212 allowing for rich application experiences compared to browser-based applications 122. Compared to the browser-based applications 122, the markup language application 108 and the hybrid application 120 may experience improved security by operating in a separate sandbox 202, omitting the web browser application, and so forth.

Figure 3:
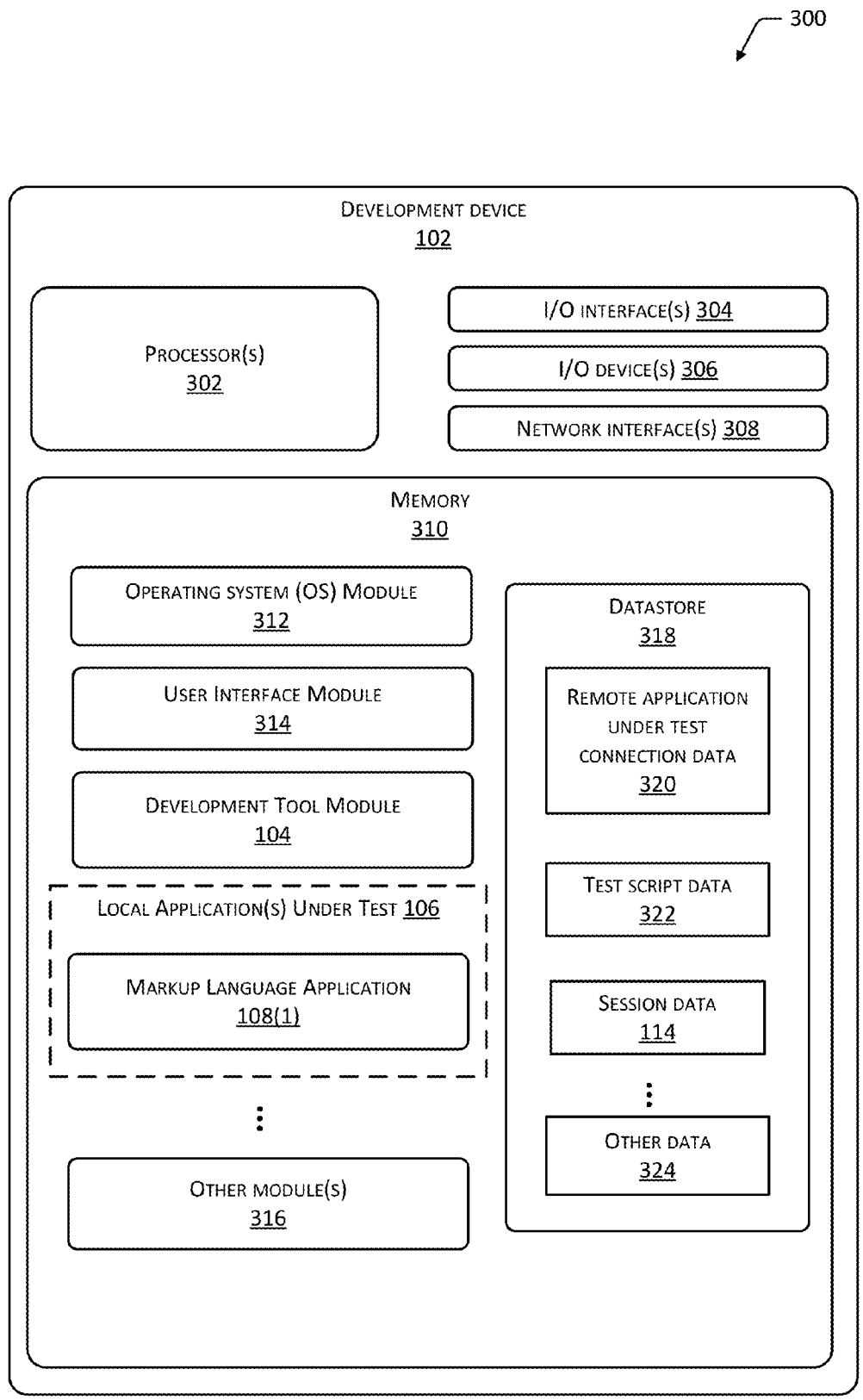
FIG. 3 depicts a block diagram of the development device configured to perform operations for testing markup language applications.

FIG. 3 depicts a block diagram 300 of the development device 102 configured to perform operations for testing markup language applications 108. The development device 102 may include one or more processors 302 configured to execute one or more stored instructions. The processors 302 may comprise one or more cores.

The development device 102 may include one or more input/output (I/O) interface(s) 304 to allow the development device 102 to communicate with other devices. For example, the I/O interface(s) 304 may be configured to provide a universal serial bus ("USB") connection compliant with the standards promulgated by the USB Implementers Forum, Inc. of Beaverton, Oreg. to couple to the computing device 116.

The I/O interface(s) 304 may couple to one or more I/O devices 306. The I/O device(s) 306 may include user input devices such as one or more of a keyboard, a mouse, a pen, a game controller, a voice input device, a touch input device, a gestural input device, and so forth. The I/O device(s) 306 may include output devices such as one or more of a display, a printer, audio speakers, haptic output devices, and so forth. In some embodiments, the I/O device(s) 306 may be physically incorporated with the development device 102 or be externally placed.

The development device 102 may also include one or more network interfaces 308 to enable communications between the development device 102 and other networked devices. Such network interface(s) 308 may include one or more network interface controllers (NICs) or other types of transceiver devices configured to send and receive communications over the network(s). For example, the network interface(s) 308 may be configured to provide a Wi-Fi connection compliant with one or more IEEE 802.11 standards such as 802.11g or 802.11n. The development device 102 may also include one or more busses or other internal communications hardware or software that allow for the transfer of data between the various modules and components of the development device 102.

The development device 102 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer readable instructions, data structures, program modules, and other data for the operation of the development device 102.

The memory 310 may include at least one operating system (OS) module 312. The OS module 312 is configured to manage hardware resources such as the I/O interface(s) 304 and network interface(s) 308, and to provide various services to applications or modules executing on the processor(s) 302. In some implementations, the OS module 312 may comprise one or more operating systems configured for execution on the development device 102. For example, the OS module 312 may implement one or more of Mac OS® from Apple Corp. of Cupertino, Calif.; Windows® from Microsoft Corp. of Redmond, Wash.; Linux and its derivatives from various sources; other operating systems.

The memory 310 may include a user interface module 314, the development tool module 104, any local applications under test 106, or other module(s) 316. For example, the memory 310 may store at least a portion of the development tool module 104 comprising the Safari® Inspector from Apple Corp.

The memory 310 also includes a datastore 318 to store information for operations of the development device 102. The datastore 318 may comprise a database, array, structured list, tree, or other data structure. In some implementations, the datastore 318 may store remote application under test connection data 320. For example, the connection data such as USB port, device identifier, address, and so forth may be stored. Test script data 322 may be stored which defines particular tests or functions be executed by the development tool module 104 against an application under test. The session data 114 may be stored in the datastore 318. Other data 320 may also be stored, such as software developer preferences, configuration settings for the development tool module 104, and so forth.

Figure 4:
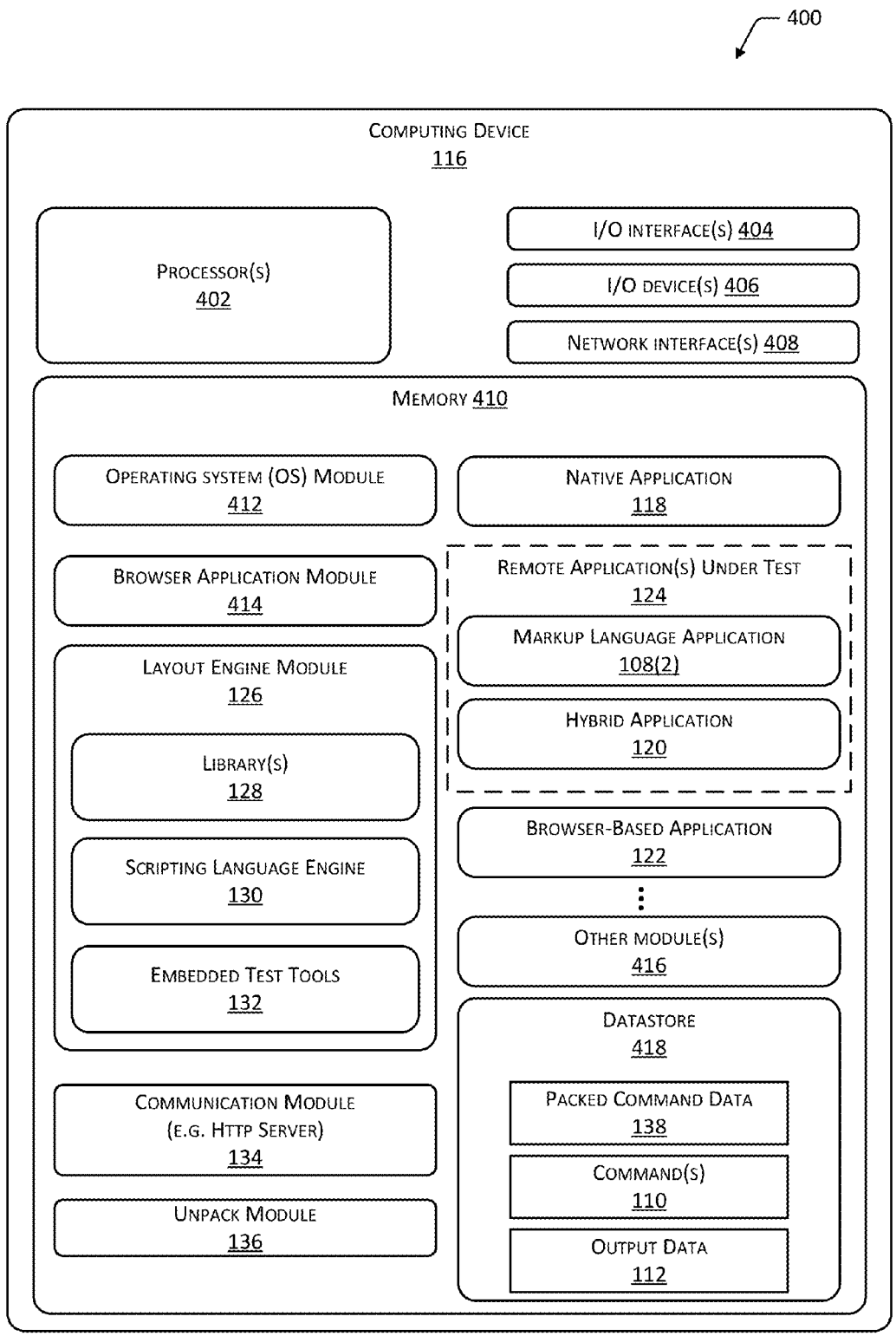
FIG. 4 depicts a block diagram of the computing device configured to perform operations for testing markup language applications.

FIG. 4 depicts a block diagram 400 of the computing device 116 configured to perform operations for testing markup language applications 108. The computing device 116 may include one or more processors 402 configured to execute one or more stored instructions. The processors 402 may comprise one or more cores.

The computing device 116 may include one or more input/output (I/O) interface(s) 404 to allow the computing device 116 to communicate with other devices. For example, the I/O interface(s) 404 may be configured to provide a universal serial bus (USB) connection to couple to the development device 102.

The I/O interface(s) 404 may couple to one or more I/O devices 406. The I/O device(s) 406 may include user input devices such as one or more of a keyboard, a mouse, a pen, a game controller, a voice input device, a touch input device, a gestural input device, the other devices. The I/O device(s) 406 may include output devices such as one or more of a display, a printer, audio speakers, haptic output devices, and so forth. In some embodiments, the I/O device(s) 406 may be physically incorporated with the computing device 116 or be externally placed.

The computing device 116 may also include one or more network interfaces 408 to enable communications between the computing device 116 and other networked devices such as those depicted in FIG. 1. Such network interface(s) 408 may include one or more network interface controllers (NICs) or other types of transceiver devices configured to send and receive communications over the network(s). For example, the network interface(s) 408 may be configured to provide a Wi-Fi connection compliant with one or more IEEE 802.11 standards such as 802.11g or 802.11n. The computing device 116 may also include one or more busses or other internal communications hardware or software that allow for the transfer of data between the various modules and components of the computing device 116.

The computing device 116 includes one or more memories 410. The memory 410 comprises one or more CRSM as described above. The memory 410 provides storage of computer readable instructions, data structures, program modules, and other data for the operation of the computing device 116.

The memory 410 may include at least one operating system (OS) module 412. The OS module 412 is configured to manage hardware resources such as the I/O interface(s) 404 and network interface(s) 408, and to provide various services to applications or modules executing on the processor(s) 402. In some implementations, the OS module 412 may comprise one or more mobile operating systems configured for execution on mobile computing devices. For example, the OS module 412 may implement one or more of iOS® from Apple Corp. of Cupertino, Calif.; Windows Mobile® from Microsoft Corp. of Redmond, Wash.; Android® from Google, Corp. of Mountain View, Calif. and its derivatives from various sources; Palm OS® from Palm Computing, Inc. of Sunnyvale, Calif. and its derivatives from various sources; BlackBerry OS® from Research In Motion Ltd. of Waterloo, Ontario, Canada; or other operating systems such as VxWorks from Wind River Systems of Alameda, Calif. In cases where the OS module 412 implements a version of iOS®, any version of iOS® may be supported including iOS 1.x, 2.x, 3.x, 4.x, 4.x, 6.x, or higher versions, including any version of iOS® for the iPhone®, iPad®, iPod Touch®, or any other compatible device. In cases where the OS module 412 implements a version of Android®, any version of Android® may be supported including but not limited to versions 2.3.x "Gingerbread," 4.0.x "Ice Cream Sandwich," 4.1.x "Jelly Bean," and so forth. As described above with regard to FIG. 2, in some implementations the OS module 412 may be configured to sandbox applications.

The memory 410 may include a browser application module 414. This browser application module 414 may be implemented as a native application 118, compiled for execution on the particular platform of the computing device 116. For example, where the platform comprises an Apple Corp. device running the iOS® operating system, the browser application module 414 may comprise the Safari® mobile browser.

The memory 410 may also include the layout engine module 126 as described above. In some implementations the layout engine module 126 may comprise the WebKit® framework and associate libraries 128, scripting language engine 130, and embedded test tools 132. The browser application module 414 or other applications on the computing device 116 may utilize at least a portion of the layout engine module 126 during operation. For example, the Safari® mobile browser may use the JavaScript core in WebKit® for execution of the scripting language 210 which comprises JavaScript.

The layout engine module 126 may be initialized prior to testing. The initialization may be configured to activate the embedded test tools 132. For example, where the layout engine module 126 comprises WebKit®, the WebKit® listener may be placed into an inspection mode configured to receive commands from the Safari® Inspector.

In some implementations where information about how to initialize or otherwise activate the embedded test tools 132 is not readily available, the layout engine module 126 or other applications may be analyzed as described in U.S. patent application Ser. No. 13/631,919, filed on Sep. 29, 2012, titled "Application Validation Through Object Level Hierarchy Analysis," and in U.S. patent application Ser. No. 13/655,667, filed on Oct. 19, 2012, titled "Application Auditing Through Object Level Code Inspection," both of which are incorporated by reference into this disclosure.

The testing described herein may further be facilitated using the systems and methods described in U.S. patent application Ser. No. 13/619,867, filed on Sep. 14, 2012, titled "Remote Control of a Mobile Device" which is incorporated by reference into this disclosure.

The communication module 134 and the unpack module 136 are also stored in the memory 410. As described above, the communication module 134 is configured to send and receive information to a device external to the computing device 116, such as the development device 102. In one implementation, the communication module 134 may comprise a lightweight HTTP server.

As also described above, the unpack module 136 is configured to process the packed commands 138 and provide unpacked commands 110(2) to the layout engine module 126. The unpacked commands 110(2) are compatible with the embedded test tools 132 and other aspects of the layout engine module 126 and an associated framework.

The memory 410 may include native applications 118, markup language applications 108, hybrid applications 120, browser-based applications 122, and so forth. As described above, the remote applications under test 124 may include the markup language application 108 and the portion of the hybrid application 120 which is non-native code.

Other modules 416 may also be stored in the memory 410, such as digital rights management modules, speech recognition modules, and so forth.

The memory 410 also includes a datastore 418 to store information for operations of the computing device 116. The datastore 418 may comprise a database, array, structured list, tree, or other data structure. The datastore 418 may store the packed command data 138, unpacked command data 110, the output data 112, or both. Other data may also be stored, such as user preferences, configuration settings, and so forth.

In some cases, one or more modifications may be made to the computing device 116, for example to root or to jailbreak the computing device 116, prior to installation of the communication module 134, the unpack module 136, and so forth.

Figure 5:
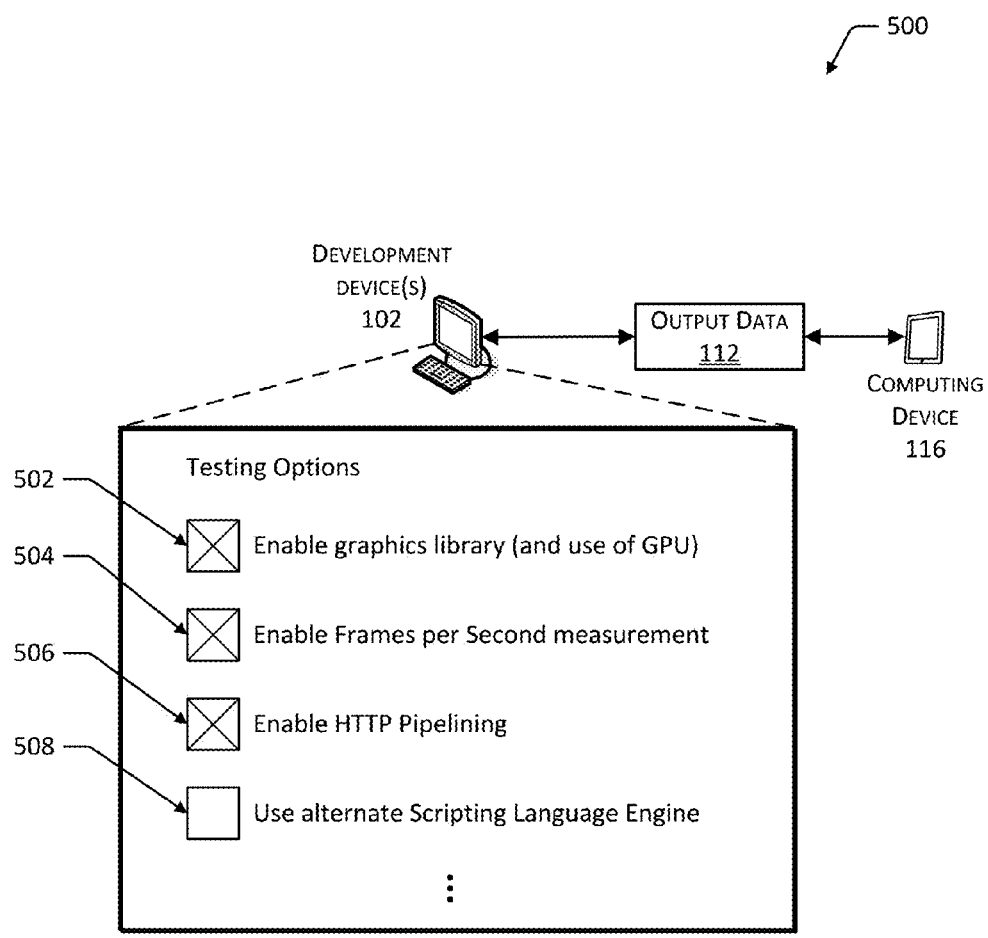
FIG. 5 depicts a user interface of testing options which may be selected by a developer for testing.

FIG. 5 depicts a user interface 500 of testing options which may be selected for testing. Several options may be selected which may affect the execution of the remote application under test 124. These options may include one or more of enabling a graphics library 502, enabling frames per second ("FPS") measurement 504, enabling HTTP pipelining 506, using an alternate scripting language engine 508, and so forth.

The option to enable graphics library 502 may be used to set the application under test 124 to use the graphics library 118, such as WebGL. These graphics libraries may be configured to use the native hardware on the computing device 116 such as a graphics processing unit. By enabling or disabling this option, data regarding graphics operations may be acquired and compared.

Selection of the option to enable FPS measurements 504 may result in the development tool module 104 or another module inserting breakpoints into the remote application under test 124. The FPS measurements may be made with or without the use of a graphics processing unit ("GPU"). These breakpoints may be configured to provide data indicative of the number of frames per second which are presented by the computing device 116.

In one implementation where the GPU is in use, the breakpoint may be associated with the remote application under test's 124 use of the requestanimationframe( ) application programming interface ("API"). In another implementation where the graphics processing is handled by a central processing unit ("CPU"), the breakpoint may be associated with the setTimeout( ) API.

In the implementation of the development tool module 104 which comprises the gbd, the output data 112 for use in determining the FPS may be provided using the following instructions:

```
# breakpoint requestanimationframe
gdb>   commands
```

-continued

```
gdb>   date
gdb>   bt
gdb>   c
gdb>   end
```

These commands set the gdb to dump data and backtrace information when the requestanimationframe( ) is called from the remote application under test 124, as executing as a frontmost application in the test environment. This information may then be analyzed to determine the FPS.

Selection of the enable HTTP pipelining configures the remote application under test 124 to use HTTP pipelining. HTTP pipelining sends multiple HTTP requests on a single transmission control protocol ("TCP") connection without waiting for corresponding responses.

Selection of an alternate scripting language engine 508 may set the computing device to use a different scripting language engine 130 on the device. In some implementations the alternate scripting language engine 508 may be selected from a list of possible engines. For example, the developer may wish to test the remote application under test 124 using one or more of the standard JS Core, Nitro JS, Carakan, and so forth. Execution using different scripting language engines 130 may be used to provide diagnostic or development data which may aid the developer in improving the execution of the remote application under test 124.

In one implementation, the development tool module 104 may make changes to the remote application under test 124 to select the alternate scripting language engine 130. In another implementation the development tool module 104 may modify the remote application under test 124 to execute using the UIWebView class reference, which may then be passed to an alternate scripting language engine 130. For example, on an iOS® device, this technique may be used to execute the remote application under test 124 using the Nitro JS scripting language engine 130.

Other options may be provided as well. For example, the user may specify use of particular audio libraries for use in audio processing.

Figure 6:
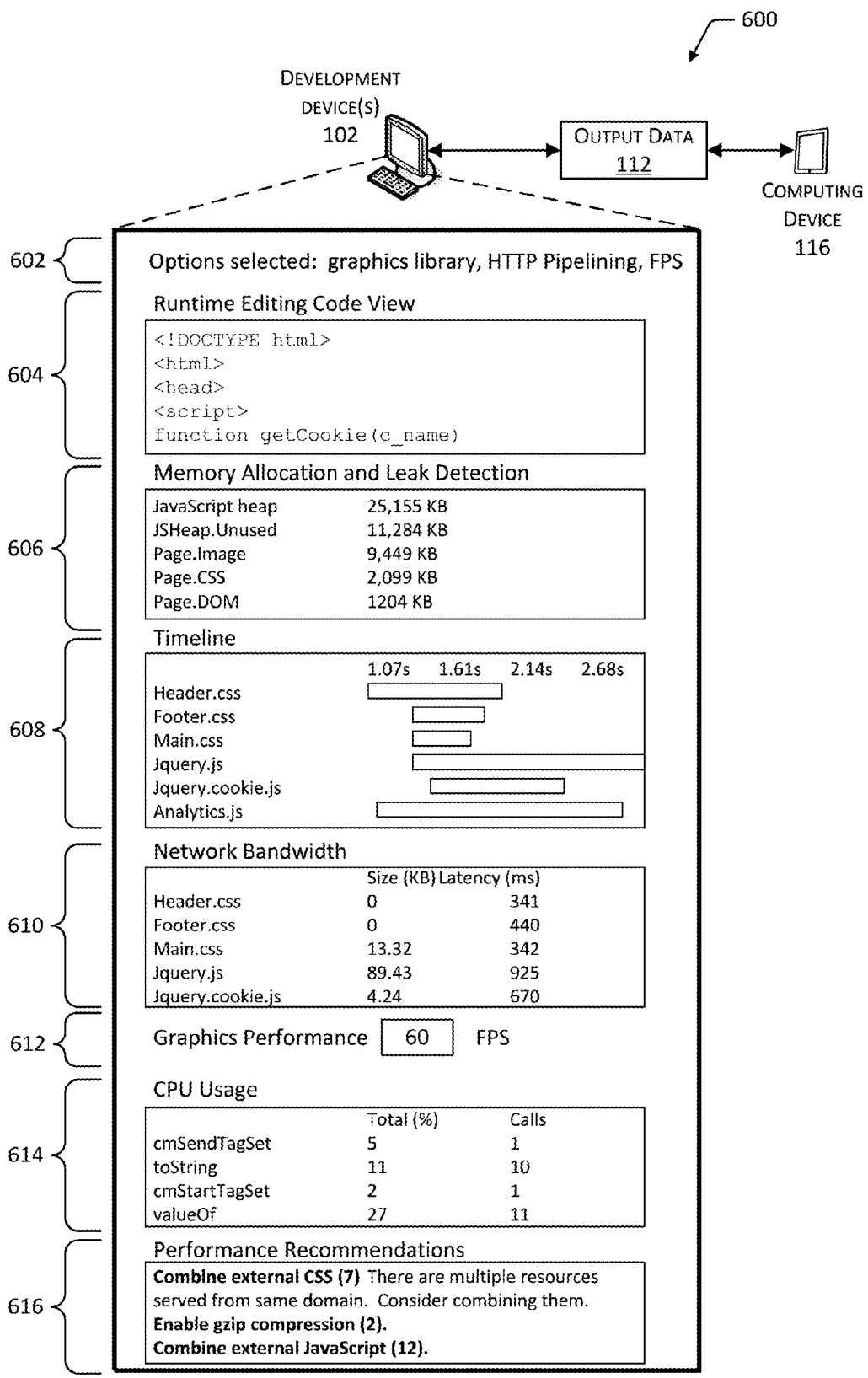
FIG. 6 depicts a user interface of testing results from the markup language application executing on the remote computing device.

FIG. 6 depicts a user interface 600 of output data 112. The output data 112 may be received using the communication module 134 from the remote application under test 124 executing on the computing device 116. In other implementations, the output data 112 may be stored locally to the computing device 116 and retrieved. In some implementations the development tool module 104 may provide this user interface 600.

The output data 112 is depicted in a graphical user interface, however in other implementations the information may be presented as a character user interface, or may be stored for processing by another application. For example, the output data 112 may be stored for processing by an analytical application such as Splunk by Splunk Inc. of San Francisco, Calif., Nagios as promulgated by Nagios Enterprises LLC of Saint Paul, Minn.

The user interface 600 may include one or more indications 602 of options which have been selected. For example, these may include the options discussed above with respect to FIG. 5.

A runtime editing code view 604 is presented. In this view, the software developer may see a portion of the code such as the markup language 208, the scripting language 210, or both, at a particular point in execution. For example, the runtime editing code view 604 may present a portion of the code where an error has occurred. The runtime editing code view

604 may also allow the software developer to make changes to the code for subsequent testing.

Memory allocation and leak detection data 606 may be depicted. This information may include information such as memory allocated to particular processes. For example, the software developer may use this information to determine that the markup language application 108 has a particular process which has been allocated memory for use but is not released after use or is inaccessible.

Timeline data 608 may be presented. The timeline data 608 may present information about which elements have been accessed, the duration of that access, and so forth. Network bandwidth data 610 may also be presented. The network bandwidth data 610 provides information about a quantity of data transferred with respect to a particular element and the duration of that transfer.

Graphics performance data 612 such as FPS may be presented. For example, where the option to enable graphics library 502 has been selected, resulting information may be presented.

CPU usage data 614 or other information about hardware resource usage on the computing device 116 may also be presented. In this illustration, various threads of the remote application under test 124 and their associated usage of processor 402 resources may be presented to the software developer.

Performance recommendations 616 may be provided to the software developer. These recommendations may call attention to programming or design errors and suggest remedies. For example, a recommendation is shown that the gzip data compression be enabled.

The test results and functions depicted are provided for illustration, and not by way of limitation. In some implementations additional tests may be added, some tests may be omitted, and so forth.

Illustrative Processes

Figure 7:
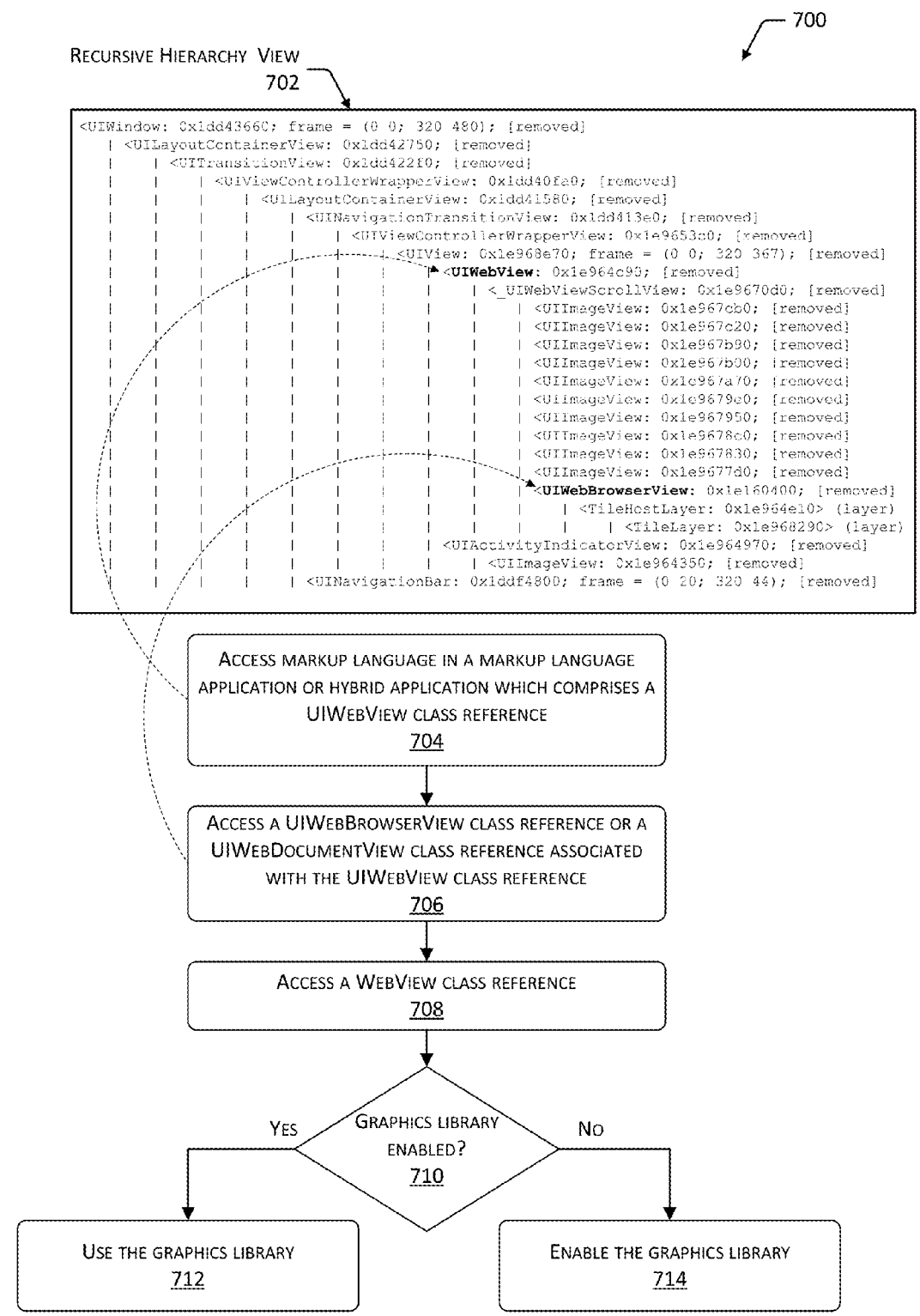
FIG. 7 depicts a flow diagram of a process on a computing device, the process for enabling a graphics library for testing.

FIG. 7 depicts a flow diagram 700 of a process for enabling a graphics library for testing. As described above, in some implementations during development a particular graphics library may be enabled or otherwise selected for use by the remote application under test 124. In one implementation the graphics library may comprise WebGL.

In this illustration a portion of a recursive hierarchy view 702 of an illustrative remote application under test 124 is depicted. For ease of illustration and not as a limitation, some portions of the hierarchy have been removed. These portions are indicated with the string "[removed]".

Block 704 accesses the markup language 208 in the markup language application 108 or the hybrid application 120. This markup language 208 includes one or more UIWebView class references.

Block 706 accesses the UIWebBrowserView class reference, or a UIWebDocumentView class reference, which is associated with the UIWebView class reference. Block 708 accesses a WebView class reference.

Block 710 determines when the graphic library is enabled. In one implementation this determination may include inspection of tag "setWebGLEnabled" to determine whether WebGL is enabled with a value of 1 or disabled with a value of 0.

When the block 710 determines the graphics library is enabled, the process may proceed to block 712. Block 712 continues with execution of the remote application under test 124, using one or more of the graphics libraries.

When the block 710 determines the graphics library is disabled, the development tool module 104 may modify the remote application under test 124 to enable the graphics library. For example, the value of the "setWebGLEnabled" may be changed from 0 to 1. The process may then continue to execute, using the one or more graphics libraries.

As described above with regard to FIG. 5, the output data 112 may be acquired to allow for comparison between execution which uses the graphics library and execution which does not. This information may then be used by the developer to modify the remote application under test 124, such as by enabling the use of the graphics libraries.

Figure 8:
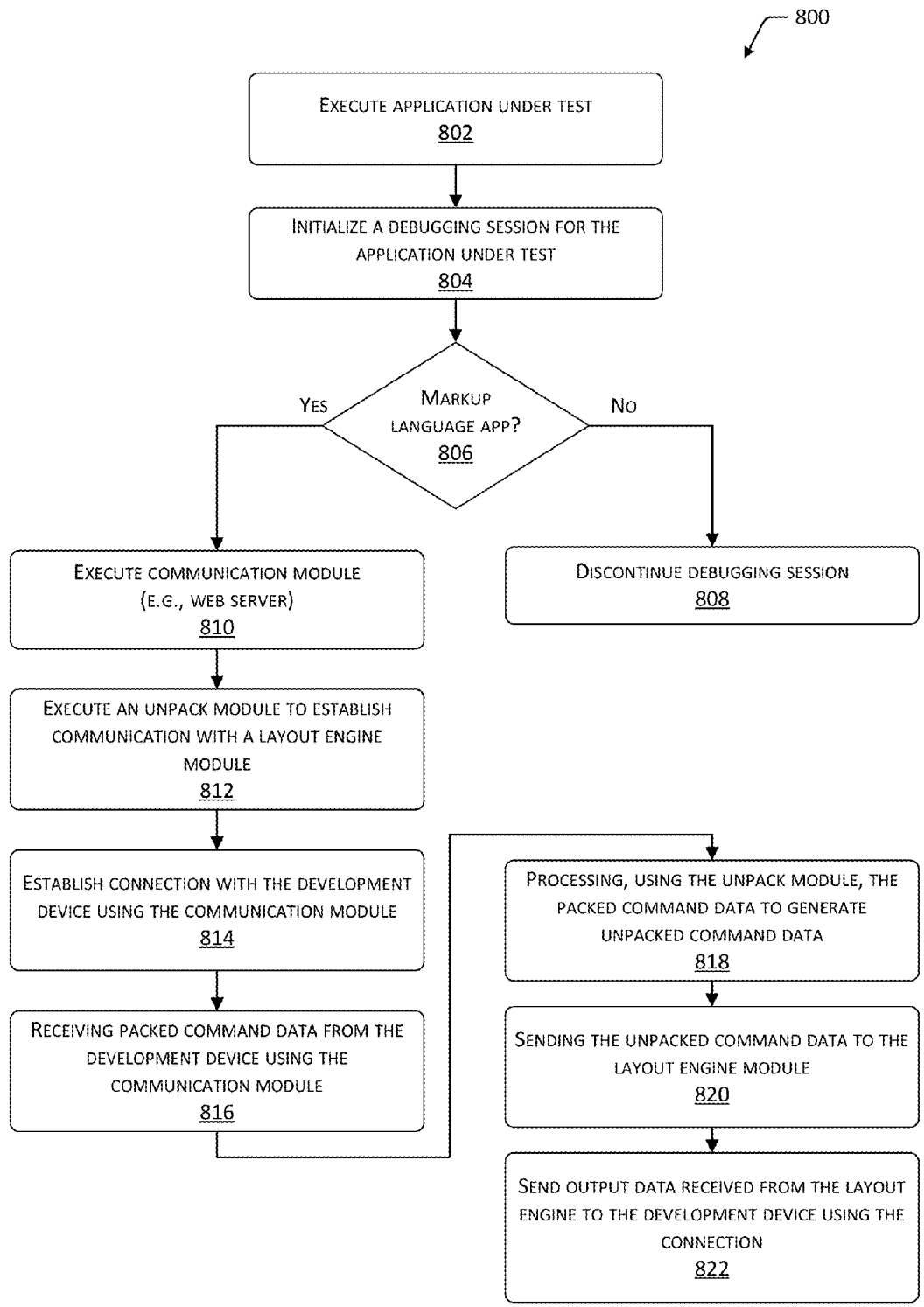
FIG. 8 depicts a flow diagram of a process on a computing device, the process for establishing communication between the development tool module on the development device and the embedded test tool executing on the remote computing device.

FIG. 8 depicts a flow diagram 800 of a process on a computing device for establishing communication between the development tool module 104 on the development device and the embedded test tool 132 executing on the computing device 116. In some implementations this process may be implemented by the layout engine module 126, the communication module 134, and the unpack module 136 on the computing device 116.

Block 802 executes the remote application under test 124. For example, the layout engine module 126 may begin processing the markup language application 108. As described above, the remote application under test 124 may not include debug code. For example, using the techniques described herein, the remote application under test 124 may not be modified to include SDK debugging code, breakpoints, and such.

The application under test 124 may comprise one or more instructions expressed in the markup language 208, the scripting language 210, or a combination thereof. In some implementations the scripting language 210 comprises JavaScript. The layout engine module 126 may comprise an implementation of WebKit®.

Block 804 initializes, in the layout engine module 126, a debugging session or other test session for the remote application under test 124. The debugging session or other test session may be configured to generate the output data 112 associated with the remote application under test 124. In implementations where the layout engine module 126 comprises WebKit®, initialization may comprise placing the WebKit® listener into an inspection mode configured to receive commands from the Safari® Inspector executing on the development device 116.

In implementations which are associated with the Safari® Inspector as developed by Apple Corp., the following functions and commands may be implicated either directly or indirectly during initialization of the Safari® Inspector and the corresponding WebKit®.

---

WebInspector-Obsolete.h:#import <WebKit/WebInspector.h>
WebInspector-Obsolete.h:@interface WebInspector (Obsolete)
WebInspector-Obsolete.h:+ (id)webInspector;
WebInspector.h:@class WebInspectorFrontend, WebView;
WebInspector.h:@interface WebInspector : NSObject
WebInspector.h: WebInspectorFrontend *_frontend;
WebInspectorClientRegistry.h:@interface WebInspectorClientRegistry :
   NSObject
WebInspectorClientRegistry.h:   struct HashMap<unsigned int,
   WebInspectorClient*, WTF::IntHash<unsigned int>,
   WTF::HashTraits<unsigned int>, WTF::HashTraits
   <WebInspectorClient*>>
   _pageClientMap;
WebInspectorClientRegistry.h:   id
   <WebInspectorClientRegistryDelegate>
   _delegate;
WebInspectorClientRegistry.h:- (void)registerClient: (struct
   WebInspectorClient *)arg1;
WebInspectorClientRegistry.h:- (void)unregisterClient: (struct
   WebInspectorClient *)arg1;
WebInspectorClientRegistry.h: (struct WebInspectorClient
   *)clientForPageId:(unsigned int)arg1;

-continued

```
WebInspectorClientRegistry.h:@property(nonatomic) id
    <WebInspectorClientRegistryDelegate> delegate; // @synthesize
    delegate=_delegate;
WebInspectorClientRegistryDelegate-Protocol.h:@protocol
    WebInspectorClientRegistryDelegate
WebInspectorClientRegistryDelegate-Protocol.h:-
    (void)didRegisterClient: (struct WebInspectorClient *)arg1;
WebInspectorClientRegistryDelegate-Protocol.h:-
    (void)didUnregisterClient: (struct WebInspectorClient *)arg1;
WebInspectorFrontend.h:@interface WebInspectorFrontend : NSObject
WebInspectorFrontend.h:    struct WebInspectorFrontendClient
    *m_frontendClient;
WebInspectorFrontend.h:- (id)initWithFrontendClient: (struct
    WebInspectorFrontendClient *)arg1;
WebInspectorRemoteChannel.h:@class WebInspectorServerConnection;
WebInspectorRemoteChannel.h:@interface WebInspectorRemoteChannel :
    NSObject
WebInspectorRemoteChannel.h:    WebInspectorServerConnection
*_remote;
WebInspectorRemoteChannel.h:    struct WebInspectorClient * local;
WebInspectorRemoteChannel.h:- (id)initWithRemote: (id)arg1 local: (struct
    WebInspectorClient *)arg2;
WebInspectorServer-Protocol.h:@protocol WebInspectorServer
WebInspectorServerConnection.h:@class WebInspectorRemoteChannel;
WebInspectorServerConnection.h:@interface
WebInspectorServerConnection :
    NSObject
WebInspectorServerConnection.h:    WebInspectorRemoteChannel
*_channel;
WebInspectorServerConnectionHTTP.h:#import
    <WebKit/WebInspectorServerConnection.h>
WebInspectorServerConnectionHTTP.h:@interface
    WebInspectorServerConnectionHTTP : WebInspectorServerConnection
WebInspectorServerConnectionHTTP.h:-
    (void)sendHTTPInspectorPageResponse: (id)arg1;
WebInspectorServerConnectionXPC.h:#import
    <WebKit/WebInspectorServerConnection.h>
WebInspectorServerConnectionXPC.h:@class NSString,
    WebInspectorServerXPC;
WebInspectorServerConnectionXPC.h:@interface
    WebInspectorServerConnectionXPC : WebInspectorServerConnection
WebInspectorServerConnectionXPC.h:    WebInspectorServerXPC
*_server;
WebInspectorServerHTTP.h:#import "WebInspectorServer-Protocol.h"
WebInspectorServerHTTP.h:@interface WebInspectorServerHTTP :
NSObject
    <WebInspectorServer>
WebInspectorServerXPC.h:#import "WebInspectorClientRegistryDelegate-
    Protocol.h"
WebInspectorServerXPC.h:#import "WebInspectorServer-Protocol.h"
WebInspectorServerXPC.h:@class NSMutableDictionary,
    WebInspectorXPCWrapper;
WebInspectorServerXPC.h:@interface WebInspectorServerXPC :
NSObject
    <WebInspectorServer, WebInspectorClientRegistryDelegate>
WebInspectorServerXPC.h: WebInspectorXPCWrapper *_xpcConnection;
WebInspectorServerXPC.h:- (void)didRegisterClient: (struct
    WebInspectorClient *)arg1;
WebInspectorServerXPC.h:- (void)didUnregisterClient: (struct
    WebInspectorClient *)arg1;
WebInspectorWindowController.h:@interface
WebInspectorWindowController :
    NSObject
WebInspectorWindowController.h: struct WebInspectorFrontendClient
    *_frontendClient;
WebInspectorWindowController.h: struct WebInspectorClient
    *_inspectorClient;
WebInspectorWindowController.h: BOOL _destroyingInspectorView;
WebInspectorWindowController.h:- (void)setFrontendClient: (struct
    WebInspectorFrontendClient *)arg1;
WebInspectorWindowController.h:- (void)setInspectorClient: (struct
    WebInspectorClient *)arg1;
WebInspectorWindowController.h:- (struct WebInspectorClient
    *)inspectorClient;
WebInspectorWindowController.h:- (void)destroyInspectorView:
(_Bool)arg1;
WebInspectorXPCWrapper.h:@interface WebInspectorXPCWrapper :
NSObject
WebInspectorXPCWrapper.h: id <WebInspectorXPCWrapperDelegate>
    _delegate;
WebInspectorXPCWrapper.h:@property(nonatomic) id
    <WebInspectorXPCWrapperDelegate> delegate; // @synthesize
    delegate=_delegate;
WebNodeHighlight.h: struct InspectorController *_inspectorController;
WebNodeHighlight.h:- (id)initWithTargetView:(id)arg1
    inspectorController: (struct InspectorController *)arg2;
WebNodeHighlight.h:- (struct InspectorController *)inspectorController;
WebPreferences-WebPrivate.h:- (BOOL)webInspectorServerEnabled;
WebPreferences-WebPrivate.h:-
    (void)setWebInspectorServerEnabled: (BOOL)arg1;
WebPreferences-WebPrivate.h:- (short)webInspectorServerPort;
WebPreferences-WebPrivate.h:-
    (void)setWebInspectorServerPort: (short)arg1;
WebView-WebPrivate.h:+ (id)sharedWebInspectorServer;
WebView-WebPrivate.h:+ (void)_enableRemoteInspector;
WebView-WebPrivate.h:+ (void)_disableRemoteInspector;
WebView-WebPrivate.h:+ (BOOL)_isRemoteInspectorEnabled;
WebView-WebPrivate.h:- (id)inspector;
```

In some implementations, these functions and the commands associated with them may be processed by the Safari® Inspector daemon "/usr/libexec/webinspectord".

Block 806 determines when the remote application under test 124 comprises a markup language application 108 or a hybrid application 120 which includes instructions expressed as the markup language 208, the scripting language 210, or both. In one implementation, this determination may include examining the code in the remote application under test 124 to determine when one or more UIWebView runtime instances are referenced.

When the determination of the block 806 is that the remote application under test 124 is not a markup language application 108, the process proceeds to block 808. For example, absence of at least one UIWebView runtime instance may result in the determination that the remote application under test 124 is not a markup language application 108 or hybrid application 120. Block 808 discontinues the debugging session, as the embedded test tools 132 would be ineffective for non-markup language applications 108.

When the determination of the block 806 is that the remote application under test 124 comprises a markup language application 108 or a hybrid application 120, the process proceeds to 810. For example, the application under test 124 may comprise a plurality of runtime instances of UIWebView.

Block 810 executes the communication module 134 configured to establish a connection with an external device, such as the development device 102. As described above, in some implementations the communication module 134 may comprise a HTTP server.

Block 812 executes the unpack module 136. As described above, the unpack module 136 is configured to establish communication between the communication module 134 and the layout engine module 126.

Block 814 establishes a connection with the external device, such as the development device 102, using the communication module 134. For example, a connection may be established using HTTP/TCP over a USB connection between the computing device 116 and the development device 102.

Block 816 receives packed command data 138 from the external device, such as the development device 102, using the communication module 134. For example, the development device 102 may send packed commands 138 using HTTP/TCP over a USB connection between the devices.

Block 818 processes the packed command data 138 to generate unpacked command data 110. In some implementations, this processing may use the unpack module 136. As described above, the processing may include extracting payload data from one or more packets. In one implementation this processing may include removing TCP headers and generating one or more strings. These strings are configured for processing by the layout engine module 126.

Block 820 sends the unpacked command data 110 to the layout engine module 126. The command data 110 may be generated by the development tool module 104 executing at least in part on the external device such as the development device 102.

The command data 110 may be processed by the layout engine module 126. The layout engine module 126 may then generate output 112 which is responsive at least in part to the command data 110. For example, the command data 110 may instruct the embedded test tools 132 to provide information regarding the usage of the processor 402 usage by the executing threads of the executing application under test.

Block 822 sends the output data 112 received from the layout engine module 126 to the external device using the connection. Continuing the example above, the output data 112 produced by the embedded test tools 132 of the layout engine module 126 may be passed to the communication module 134 which may use HTTP to transfer the output data 112 to the development device 102.

Figure 9:
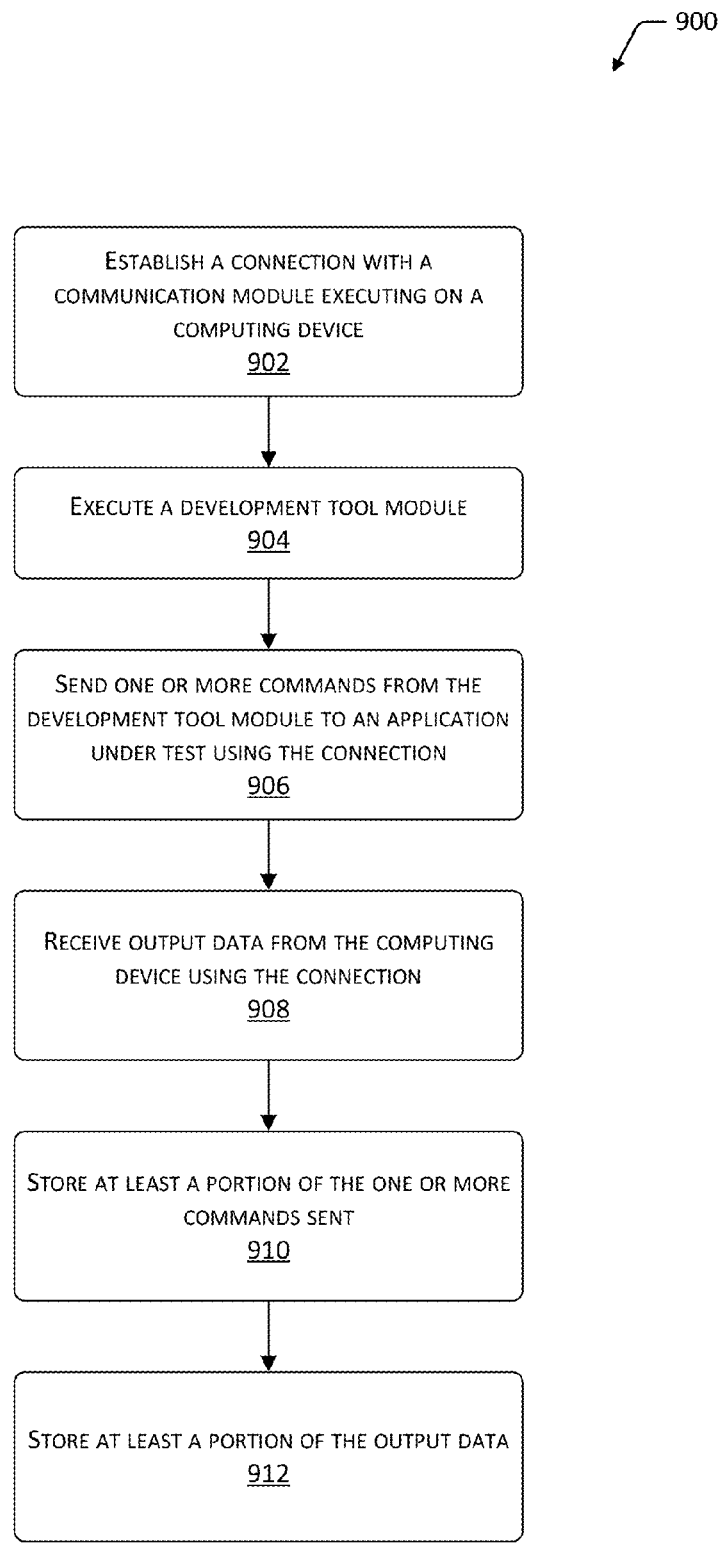
FIG. 9 depicts a flow diagram of a process on the development device, the process for establishing communication with the embedded test tool executing on the remote computing device.

FIG. 9 depicts a flow 900 diagram of a process on the development device 102 for establishing communication with the embedded test tools 132 executing on the computing device 116. This process enables the remote application under test 124 to appear to be a local application under test 106 to the development tool module 104. As a result, the functionality of the development tool module 104 is applied to the remote application under test 124. In some implementations this process may be implemented by the development tool module 104 executing at least in part on the development device 102.

Block 902 establishes a connection with the communication module 134 executing on the computing device 116. In one implementation, the connection may use TCP sent over USB. However, other transports and protocols may be used in other implementations. For example, TCP over a wired Ethernet connection may be used.

As described above, the connection is configured to provide communication with the layout engine module 126 processing the remote application under test 124 on the computing device 116. As described above, the remote application under test 124 may comprise a plurality of UIWebView class references. These class references may, when executed by the layout engine module 126, result in a plurality of UIWebView runtime instances.

Block 904 executes a development tool module 104. In one implementation the development tools may include the Safari® Inspector as developed by Apple Corp. For example, this implementation with the Safari® Inspector may be used when the OS module 412 of the computing device 116 comprises one or more of the iOS® operating systems.

Block 906 sends one or more packed commands 138 from the development tool module 104 to the remote application under test 124 executing on the computing device 116 using the connection. In some implementations the development tool module 104 may send non-packed commands 110, but these may be processed to form packed commands 138 during the transmission process.

In some implementations, the one or more commands, either packed 138 or non-packed 110, may be based at least in part on the options selected, as described above with regard to FIG. 5.

The one or more commands may be configured to affect execution. In one implementation, the one or more commands are configured to enable use one or more graphics libraries 128 by the application under test executing on the computing device 116. For example, use of the WebGL library may be enabled.

The one or more commands may also be configured to cause processing of the scripting language 210 of the remote application under test 124 with a particular scripting language engine 130 executing on the computing device 116. For example, commands may enable the usage of the Nitro JS scripting language engine 130, rather than the JS Core on the computing device 116 using the iOS® operating system.

In another implementation, the one or more commands may be configured to enable HTTP pipelining by the application under test executing on the computing device.

The one or more commands may also be used to add testing or diagnostic breakpoints to the remote application under test 124. In one implementation, the one or more commands are configured to add one or more breakpoints associated with graphics processing to the remote application under test 124. Based on information gathered from the breakpoints, such as their time of execution, a count of frames per second processed by the computing device 116 may be generated.

Block 908 receives output data 112 from the computing device 116 using the connection. For example, the communication module 134 executing on the computing device 116 may send the output data 112 provided by the embedded test tools 132 using HTTP.

Block 910 stores the one or more commands 110 sent to the application under test on the computing device 116. This information may be used for analysis, to replay a test session, and so forth.

Block 912 stores the output data 112 received from the computing device 116. As described above, this information may then be processed by the development tool module 104, or analytical applications.

Figure 10:
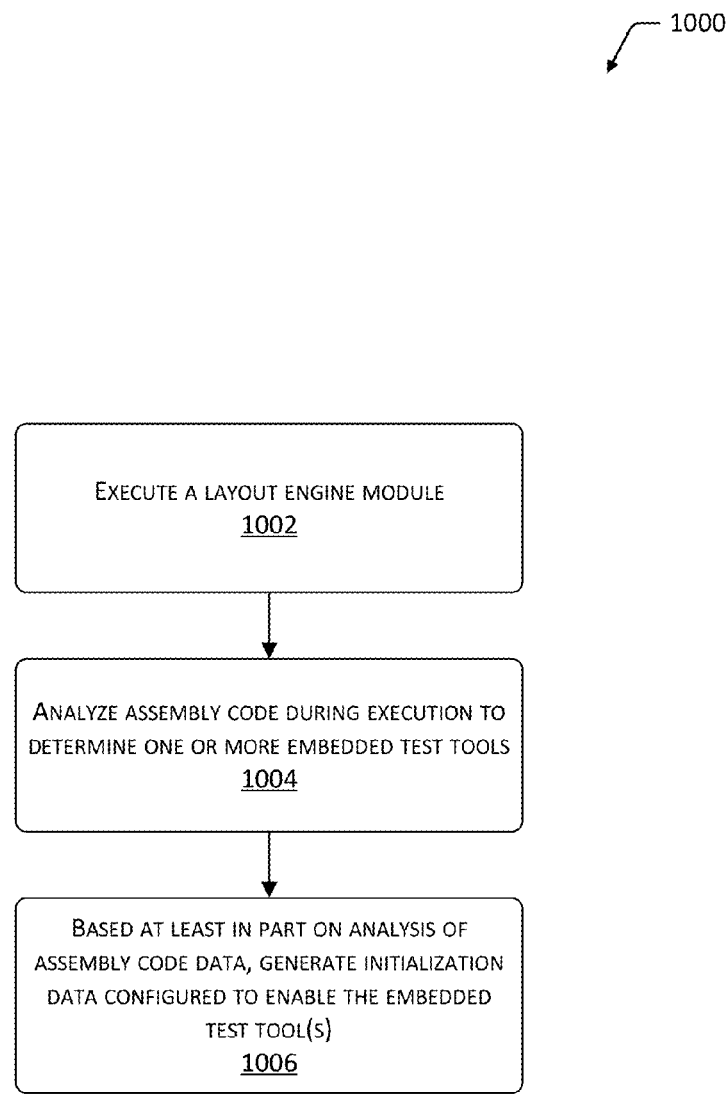
FIG. 10 depicts a flow diagram of a process for analyzing a layout engine module to determine one or more development tool features therein.

FIG. 10 depicts a flow diagram 1000 of a process for analyzing the layout engine module 126 to determine one or more embedded test tools therein. In some implementations, information about the embedded test tools 132 available in the layout engine module 126 or other modules on the computing device 116 may be unavailable. For example, documentation describing the embedded test tools 132 may be incorrect or non-existent.

This process may be implemented by a desktop computer, server, or other device. The following process may use one or more systems or techniques as disclosed in U.S. patent application Ser. No. 13/619,867, filed on Sep. 14, 2012, titled "Remote Control of a Mobile Device," U.S. patent application Ser. No. 13/631,919, filed on Sep. 29, 2012, titled "Application Validation Through Object Level Hierarchy Analysis," and in U.S. patent application Ser. No. 13/655,667, filed on Oct. 19, 2012, titled "Application Auditing Through Object Level Code Inspection," all of which are incorporated by reference into this disclosure.

Block 1002 executes the layout engine module 126. Block 1004 analyzes assembly code during execution of the layout engine module 126 to determine a presence of one or more embedded test tools 132, or application interfaces associated with the one or more embedded test tools 132. For example, particular code constructs associated with debugging may be sought and identified in the code. This analysis may include the object level code inspection or other techniques described in the above referenced U.S. Patent Applications.

Block 1006, based at least in part on an analysis of the assembly code data, generates initialization data configured to enable the embedded test tools 132. This initialization data may then be used by the development tool module 104 to set the layout engine module 126 on the computing device 116 into a test or debugging mode which may provide output data 112 about the remote application under test 124.

Those having ordinary skill in the art will readily recognize that certain steps or operations illustrated in in the figures above can be eliminated, combined, subdivided, executed in parallel, or taken in an alternate order. Moreover, the methods described above may be implemented as one or more software programs for a computer system and are encoded in a computer-readable storage medium as instructions executable on one or more processors.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
   at least one processor;
   at least one memory coupled to the at least one processor and storing instructions configured for execution on the at least one processor, the instructions comprising:
   a user interface for testing options;
   a markup language application including a first set of instructions expressed with one scripting language and a second set of instructions expressed with a markup language;
   a selected scripting language engine configured to interpret the one scripting language, wherein the selected scripting language engine is selected for a debugging session from among a plurality of scripting language engines using the user interface of testing options, wherein each scripting language engine of the plurality of scripting language engines is configured to interpret the one scripting language;
   a communication module configured to receive at least packed command data associated with the debugging session;
   an unpack module configured to:
     generate unpacked command data based on the received packed command data; and
     provide the unpacked command data to an embedded test tool; and
   the embedded test tool configured to:
     interact with the selected scripting language engine; and
     generate debugging output responsive to the unpacked command data, the debugging output generated through execution of the markup language application.

2. The system of claim 1, wherein the communication module is further configured to send, at least a portion of the debugging output responsive to the unpacked command data.

3. The system of claim 1, wherein the markup language application comprises hypertext markup language ("HTML").

4. The system of claim 1, wherein the communication module comprises a hypertext transport protocol ("HTTP") server.

5. The system of claim 1, wherein the markup language application is executed in a web browser application.

6. The system of claim 1, the communication interface comprising a universal serial bus ("USB") interface, and wherein the communication module is configured to support transmission control protocol ("TCP") over the USB interface.

7. The system of claim 1, wherein the external device is configured to execute a development tool module configured to generate the packed command data and receive the debugging output.

8. A computer-implemented method, comprising:
   executing an application under test in a layout engine module, wherein the application under test comprises one or more instructions in one scripting language, wherein a selected scripting language engine is configured to interpret the one or more instructions in the one scripting language, and wherein the selected scripting language engine is selected using a user interface of testing options;
   initializing, in the layout engine module, a debugging session for the application under test, wherein the debugging session is configured to generate output data for the application under test, wherein the debugging session is based on a testing option that selects the selected scripting language engine from among a plurality of scripting language engines, and wherein each scripting language engine of the plurality of scripting language engines is configured to interpret the one scripting language;
   executing a communication module configured to receive at least packed command data associated with the debugging session; and
   executing an unpack module configured to establish communication between the communication module and the layout engine module at least to provide unpacked command data based on the packed command data to the layout engine module.

9. The method of claim 8, further comprising sending the output data received from the layout engine module using the connection.

10. The method of claim 8, wherein the layout engine module comprises one or more test tools, and wherein the one or more test tools comprise at least one of: a runtime editing tool, a memory allocation information tool, and a platform resource usage information tool.

11. The method of claim 8, the application under test further comprising one or more instructions expressed as a markup language.

12. The method of claim 8, wherein the markup language application comprises hypertext markup language ("HTML").

13. The method of claim 8, the initializing the debugging session comprising placing the layout engine module into an inspection mode.

14. The method of claim 8, wherein the application under test comprises a plurality of runtime instances.

15. The method of claim 8, wherein the communication module comprises a hypertext transport protocol ("HTTP") server.

16. The method of claim 8, wherein providing unpacked command data based on the packed command data comprises:
  generating the unpacked command data using the unpack module by at least extracting payload data from one or more packets; and
  sending the unpacked command data to the layout engine module.

17. The method of claim 16, wherein generating the unpacked command data comprises:
  removing transmission control protocol headers; and
  generating a string configured for processing by the layout engine module.

18. The method of claim 16, wherein the packed command data is generated at least in part by a development tool.

19. The method of claim 8, further comprising:
  during the debugging session, determining a hierarchy view of the application under test, the hierarchy view including a plurality of objects associated with the application under test;
  accessing a class reference included in the hierarchy view; and
  modifying the executing of the application under test within the debugging session, based at least partly on the class reference.

20. One or more non-transitory computer-readable media storing instructions which, when executed by at least one processor, instruct the at least one processor to perform actions comprising:
  executing an application under test in a layout engine module, wherein the application under test comprises one or more instructions in one scripting language;
  initializing, in the layout engine module, a debugging session for the application under test, wherein the debugging session is configured to generate output data for the application under test, wherein the debugging session is based on a testing option to select a selected scripting language engine from among a plurality of scripting language engines, wherein the testing option to select the selected scripting language engine is selected using a user interface of testing options, and wherein each scripting language engine of the plurality of scripting language engines is configured to interpret the one scripting language;
  during the debugging session, determining a hierarchy view of the application under test, the hierarchy view including a plurality of objects associated with the application under test;
  accessing a class reference included in the hierarchy view; and
  modifying execution of the application under test within the debugging session, based at least partly on the class reference.

21. The one or more non-transitory computer-readable media of claim 20, wherein modifying execution of the application under test further comprises:
  inspecting a testing option indicating that at least one graphics library is disabled; and
  setting a value of the testing option to enable the at least one graphics library during the debugging session.

22. The one or more non-transitory computer-readable media of claim 21, wherein modifying execution of the application under test comprises:
  after setting the value of the testing option to enable the at least one graphics library, executing the application under test.

23. The one or more non-transitory computer-readable media of claim 20, wherein the debugging session is further based on a testing option to measure a number of frames per second (FPS) presented during execution of the application under test.

24. The one or more non-transitory computer-readable media of claim 20, wherein the actions further comprise:
  receiving packed command data;
  processing the packed command data to generate unpacked command data by at least extracting payload data from one or more packets; and
  sending the unpacked command data to the layout engine module.

25. The one or more non-transitory computer-readable media of claim 24, wherein the packed command data includes command data that is packetized for network communication.

26. The one or more non-transitory computer-readable media of claim 20, wherein the actions further comprise:
  sending the output data received from the layout engine module using the connection.

27. The one or more non-transitory computer-readable media of claim 20, wherein the output data comprises at least a portion of the hierarchy view.

28. The one or more non-transitory computer-readable media of claim 20, wherein the class reference comprises one or more of a document view class reference and a browser view class reference.

* * * * *